US005888043A

United States Patent [19]

Jatcko

[11] Patent Number: 5,888,043

[45] Date of Patent: Mar. 30, 1999

[54] DEVICE FOR LIFTING, MOVING, INVERTING AND RELEASING HEAVY LOADS

[76] Inventor: Joseph D. Jatcko, 3795 Birchwood Dr., Boulder, Colo. 80304

[21] Appl. No.: 795,990

[22] Filed: Feb. 5, 1997

[51] Int. Cl.[6] .......... B60P 3/00

[52] U.S. Cl. .......... 414/459; 414/460; 414/758; 414/783

[58] Field of Search .......... 414/459, 460, 414/758, 783

[56] References Cited

U.S. PATENT DOCUMENTS

| | | | |
|---|---|---|---|
| 1,920,716 | 8/1933 | Schafer . | |
| 3,110,404 | 11/1963 | De Stasi | 414/460 |
| 3,291,329 | 12/1966 | Ord . | |
| 3,330,429 | 7/1967 | Kress . | |
| 3,335,885 | 8/1967 | Livingston . | |
| 3,520,429 | 7/1970 | Andersson . | |
| 3,863,791 | 2/1975 | Brock . | |
| 3,868,025 | 2/1975 | Bratchell . | |
| 3,897,881 | 8/1975 | Brock | 414/459 |
| 3,917,093 | 11/1975 | Greaves . | |
| 4,027,808 | 6/1977 | Hardwick . | |
| 4,139,107 | 2/1979 | Ninomiya et al. | 414/460 |
| 4,168,930 | 9/1979 | Brock . | |
| 4,184,799 | 1/1980 | Arndt | 414/783 |
| 4,238,169 | 12/1980 | DePriester et al. | 414/783 |
| 4,551,059 | 11/1985 | Petoia | 414/459 |
| 4,624,618 | 11/1986 | LaBerdia et al. . | |
| 4,729,710 | 3/1988 | Kress et al. . | |
| 4,877,365 | 10/1989 | Lanigan, Jr. et al. | 414/460 |
| 5,043,132 | 8/1991 | Schramm et al. | 414/758 |
| 5,511,927 | 4/1996 | Lanigan, Sr. et al. . | |

FOREIGN PATENT DOCUMENTS

| | | | |
|---|---|---|---|
| 3902955 | 8/1990 | Germany | 414/460 |

OTHER PUBLICATIONS

The Solution: *The Posi–Turner,* Park Industries, Inc., sales literature, date unknown.

*Primary Examiner*—David A. Bucci
*Assistant Examiner*—Douglas Hess
*Attorney, Agent, or Firm*—Donald W. Margolis; John L. Isaac

[57] ABSTRACT

A device for connecting to, lifting at a first location load support surface, moving, inverting and releasing at a second load support surface individual heavy loads. The device includes a support frame for carrying heavy loads. The frame carries a mechanism for selective and controlled connection to and selective and controlled detachment from individual heavy loads, such as concrete molds with or without concrete in the molds. A lifting mechanism for providing selective and controlled vertical upward and downward movement to the connection mechanism and to any individual heavy load carried by the connection mechanism is associated with the connection mechanism. A mechanism for providing selective and controlled rotational movement of at least about 180° to the connection mechanism and to any individual heavy load carried by the connection mechanism is also associated with the connection mechanism. Finally, the device includes a mechanism for moving the support frame and any individual heavy load carried by the support frame in a selective and controlled direction. The resulting device is capable of selective and controlled connection and attachment to individual heavy loads located at a first location, the lifting of such loads vertically upward, the moving of such loads, the rotation of such loads by at least about 180°, the lowering of such loads vertically downward at a second location, and detaching of the connection mechanism from the individual heavy loads to deposit them at that second location.

36 Claims, 12 Drawing Sheets

DEVICE FOR LIFTING, MOVING, INVERTING AND RELEASING HEAVY LOADS

BACKGROUND OF THE INVENTION

1. Field of the Invention

The present invention relates generally to mechanized transport devices for heavy loads, such as containers and molds, and, more particularly, to device for lifting moving, inverting and releasing such heavy loads. Specifically, the present invention relates to devices for lifting and moving heavy containers such as molds used in the manufacture of concrete articles.

2. Description of the Prior Art

There are a wide variety of different types of devices designed to lift and carry materials and containers ranging from forklift trucks and overhead hoist systems used in factories, and the like, and container carrying trucks of various types. There are a number of existing vehicle designs which include mechanisms for lifting and then rotating containers in order to deposit or to discharge the contents therefrom. Examples of such devices include U.S. Pat. Nos. 3,291,329; 3,917,093; 3,330,429; 3,335,885; 3,520,429; 3,863,791; 4,027,808; 4,168,930 and 4,624,618. In each of these prior art examples, either the containers are intricately associated with the transport vehicle, which in most instances is a truck, or the container is lifted by the vehicle, moved to a discharge station and then tipped to discharge materials from the container. However, in each instance the container is then returned to its upright position, and unless it is permanently associated with the vehicle, then returned and deposited to their original upright position. In no such prior art is the container known to be inverted 180° or more, nor is the container deposited and released in an inverted position inasmuch as such an arrangement would be incompatible with the function of these devices.

The manufacturer of concrete articles, such as cisterns, concrete building blocks, and the like, generally includes the use of various molds for forming the concrete article.

Lifting and movement of such concrete molds requires specialized equipment as disclosed by way of example in U.S. Pat. Nos. 1,920,716; 3,868,025 and 5,511,927. The molds disclosed in these particular references, however, do not require inversion during the process of lifting and moving them and/or their concrete components. Inasmuch as such molds and concrete articles in them weigh substantial amounts, the mere lifting and moving of these molds and concrete components is very difficult, and inversion of such molds is not taught or even suggested. A known device marketed as the Posi-Turner manufactured by Elk River Concrete Products, Shakopee, Minn., illustrates an arrangement that is specifically designed to invert a mold once the concrete has been poured and cured therein. However, this particular arrangement necessitates the permanent attachment of the mold to the Posi-Turner carrier device which moves the mold and rotates it. Thus, only one mold per carrier device can be utilized in this prior art system, thereby either limiting production or requiring a plurality of such devices.

Therefor, there is a need for a device which is adapted to lift and move heavy loads, including concrete mold containers, which device is also capable of inverting these loads and releasing them in an inverted position. It is also desirable to have such a device which has the capability of releasing such loads or molds, with the result that it can handle multiple loads in order to increase the efficiency of use of such a device.

SUMMARY OF THE INVENTION

Therefore, it is one object of the present invention to provide a device for lifting and moving heavy loads which require inversion and release.

It is another object of the present invention to provide a device for lifting and moving concrete molds, including the inverting of such molds after the concrete has been placed in the molds, whether the concrete is cured or still curing in the molds.

Yet another object of the present invention is to provide a mobile, self-propelled ground vehicle for lifting and moving molds used in the formation of concrete which molds require inversion.

Still another object of the present invention is to provide a concrete mold device for the manufacture of open-ended concrete forms, including, but not limited to septic tanks, cisterns, lift stations, interceptors, equipment vaults, meter pit vaults, vacuum relief vaults, pressure relief vaults, well heads, burial vaults, secondary containment vaults, water reclamation vaults and the like.

In accordance with the above and other objects and advantages of the present invention, a device is disclosed for connecting to, lifting at a first location load support surface, moving, inverting and releasing at a second load support surface individual heavy loads. The device includes a support frame for carrying heavy loads. The frame carries a mechanism for selective and controlled connection to and selective and controlled detachment from individual heavy loads, such as concrete molds with or without concrete in the molds. A lifting mechanism for providing selective and controlled vertical upward and downward movement to the connection mechanism and to any individual heavy load carried by the connection mechanism is associated with the connection mechanism. A mechanism for providing selective and controlled rotational movement of at least about 180° to the connection mechanism and to any individual heavy load carried by the connection mechanism is also associated with the connection mechanism. Finally, the device includes a mechanism for moving the support frame and any individual heavy load carried by the support frame in a selective and controlled direction. The resulting device is capable of selective and controlled connection and attachment to individual heavy loads located at a first location, the lifting of such loads vertically upward, the moving of such loads, the rotation of such loads by at least about 180°, the lowering of such loads vertically downward at a second location, and detaching of the connection mechanism from the individual heavy loads to deposit them at that second location.

In another embodiment of the invention, the container is in the form of a concrete mold device for manufacturing open-ended concrete cisterns. This device includes an inner core form having an outer surface for forming the inner surface of the concrete cistern and includes heating and vibration mechanisms to assist in the compaction and curing of concrete poured in the mold device. In addition, a device for injecting air to the outer surface of the inner core form is provided to assist in breaking the bonds between the concrete and the form after curing of the concrete is completed. Finally, an outer jacket form is sized and shaped for spaced positioning about the inner core form to provide a mold for the concrete cistern when engaged about the inner core form. These and other objects of the present invention will become apparent to those skilled in the art from the following detailed description, showing the contemplated novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DETAILED DESCRIPTION OF THE PREFERRED EMBODIMENTS

Figure 1:
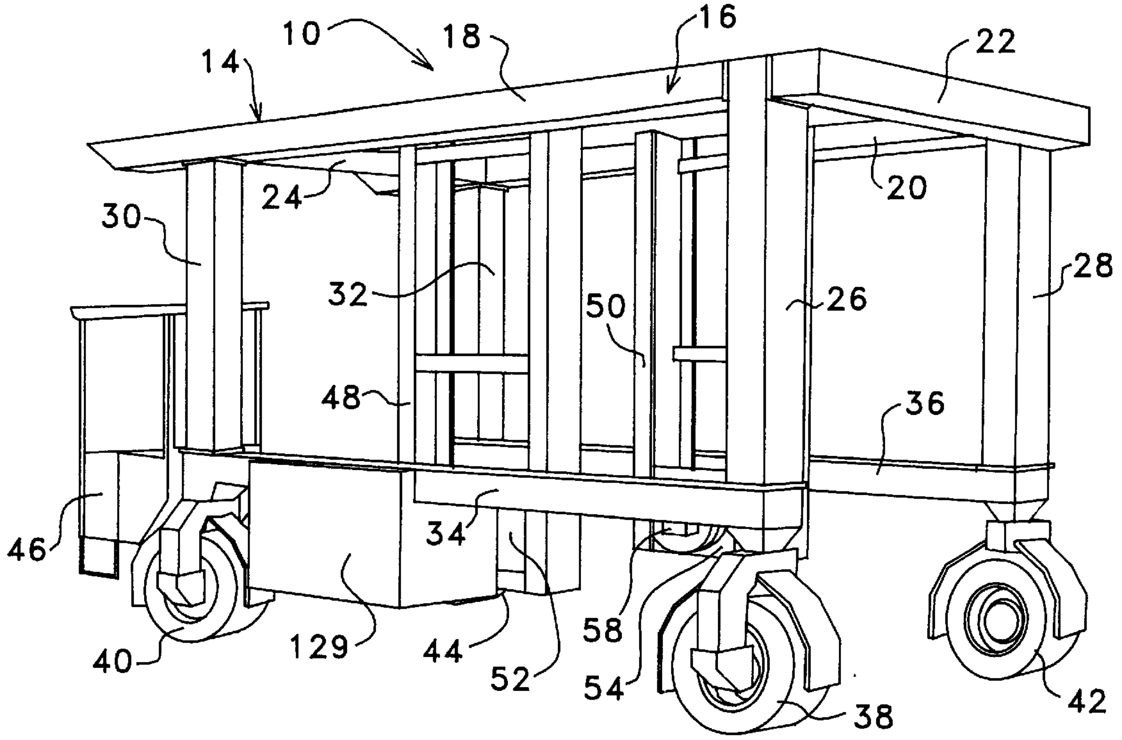
FIG. 1 is a side perspective view of a ground vehicle hoist device constructed in accordance with the present invention.
Figure 2:
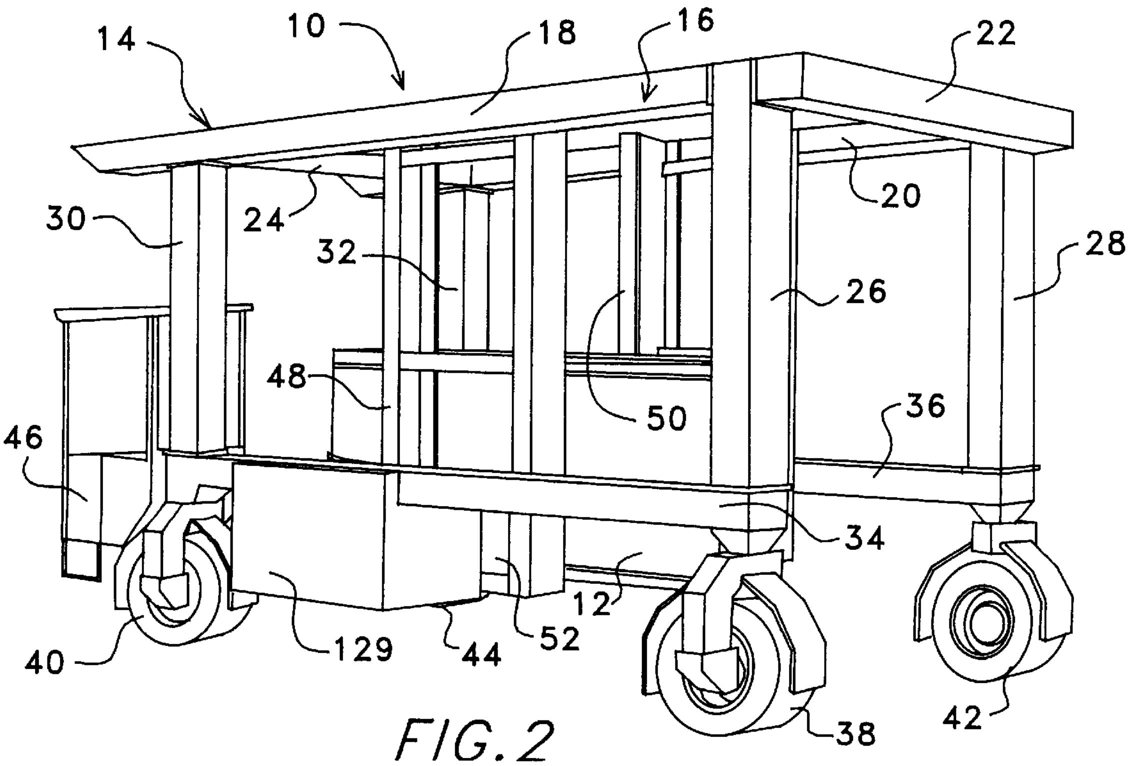
FIG. 2 is a view similar to that of FIG. 1 illustrating the device in position about a heavy container.
Figure 3:
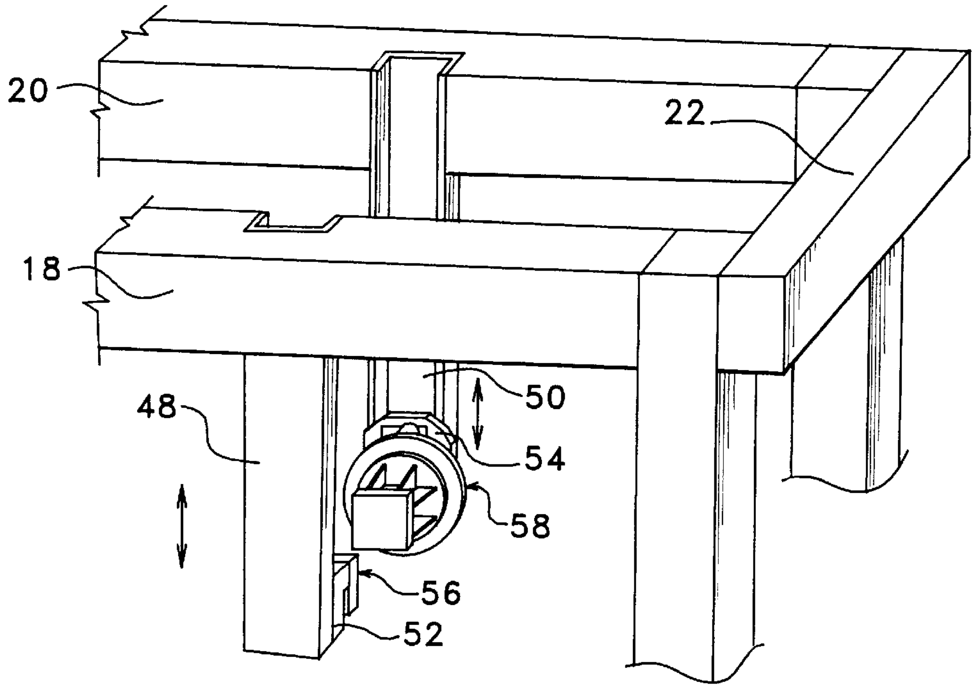
FIG. 3 is a partial schematic view of the present invention similar to that of FIG. 1 but illustrating the load attachment and rotation mechanism.

Referring first to FIGS. 1–3, a movable device 10 is illustrated for lifting, moving, inverting and releasing heavy loads or containers 12 which, in the particular embodiment illustrated are molds used for forming concrete cisterns. It should be understood, however, that the device 10 of the present invention may be utilized to lift and move any type of heavy load which requires lifting, movement, inversion and detachment while still in an inverted position, all as described in greater detail below.

In one preferred embodiment of the present invention, the device 10 is in the form of a ground vehicle device 14. The device 14 preferably includes a main frame 16 which includes a pair of spaced-apart longitudinally extending upper side support beams 18 and 20, which side support beams 18 and 20 are secured and stabilized by at least a pair of cross beam members 22 and 24. A plurality of, and preferably four, struts 26, 28, 30 and 32 depend downwardly in a substantially vertical manner to a pair of spaced-apart longitudinally extending lower side support beams 34 and 36. These members make up the main frame 16.

In the preferred embodiment of the invention, a pair of wheels 38, 40 are connected to the lower support beam 34 immediately beneath the struts 26, 30, respectively. Likewise, a second pair of wheels 42, 44 are secured to the other lower support beam 36 immediately beneath the struts 28, 32, respectively. The four wheels 38–44 operate to move the device 14. In preferred form, each of the wheels 38, 40, 42 and 44 are individually powered and they may also be individually steered in accordance with known heavy equipment technology. A driver's cab 46 is provided for an operator for the device 10 to both drive the vehicle device 14, as well as to operate the lifting and rotating mechanisms as described below.

In preferred form, a pair of spaced-apart support members 48, 50 depend downwardly from the proximate middles of the upper side support beams 18, 20, respectively. A pair of lift arms 52, 54 are preferably each secured to the load support members 48, 50, respectively. The lift arms 52, 54 are sized and adapted for vertical movement along both support members 48, 50 relative to the main frame 16. Each lift arm 52, 54 includes a free distal end 56, 58, respectively, which is adapted for carrying a mechanism for attachment and rotation of a load or container 12.

Figure 4:
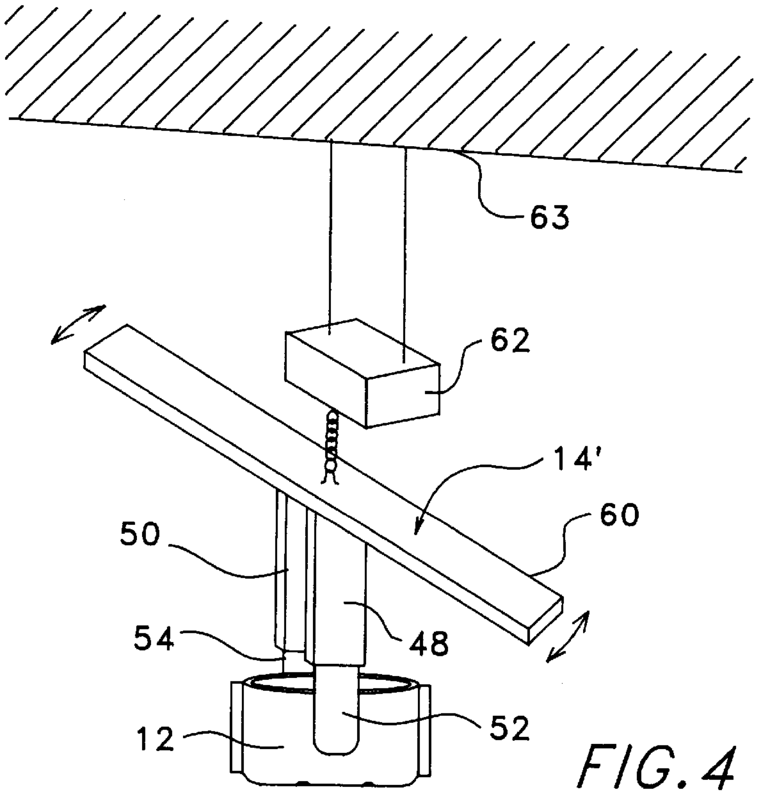
FIG. 4 is a side perspective view of a second embodiment of a hoist device constructed in accordance with the present invention and adapted for permanent factory use.
Figure 5:
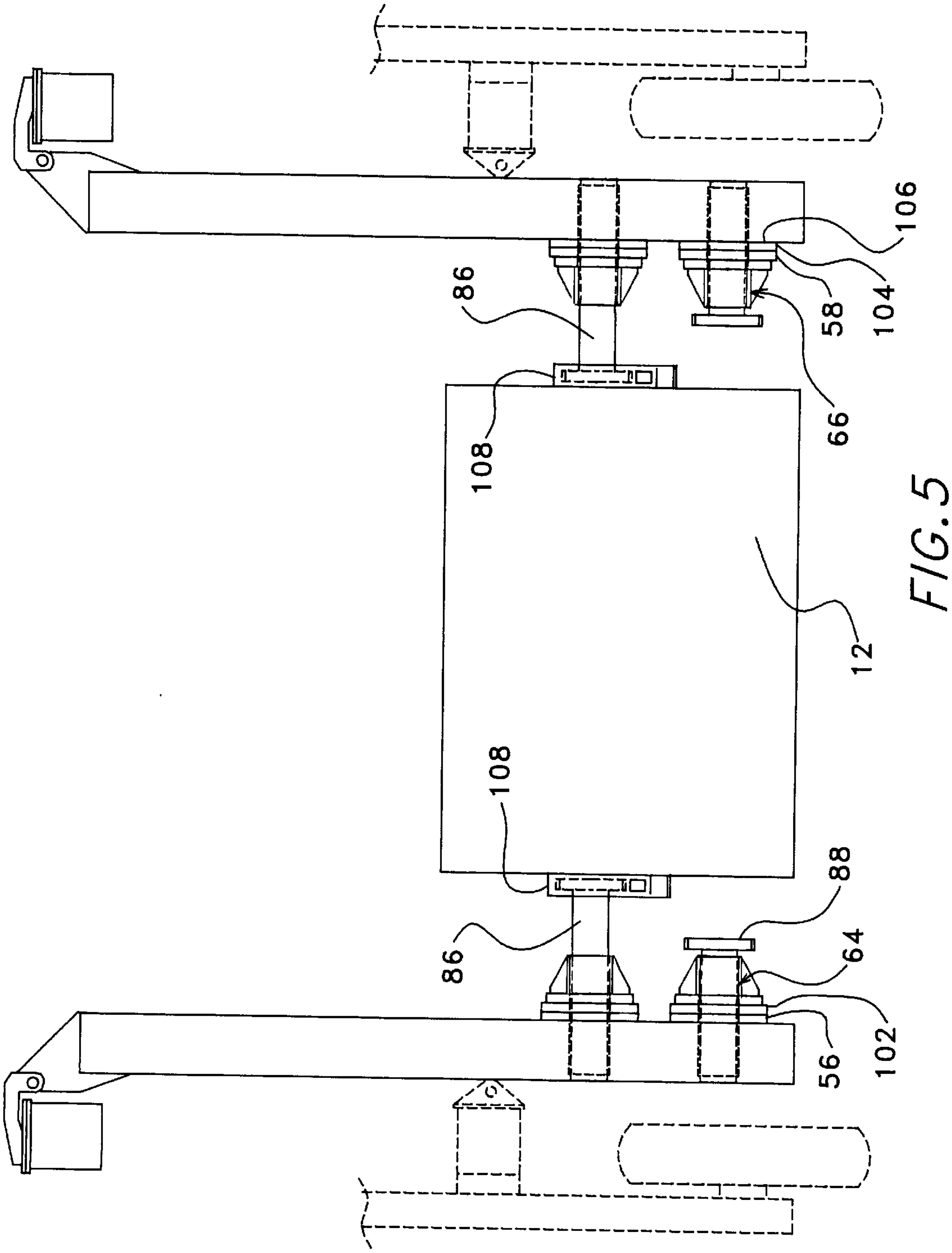
FIG. 5 is a front schematic view, with some parts in section, showing a device constructed in accordance with the present invention surrounding a container in position for attachment.
Figure 6:
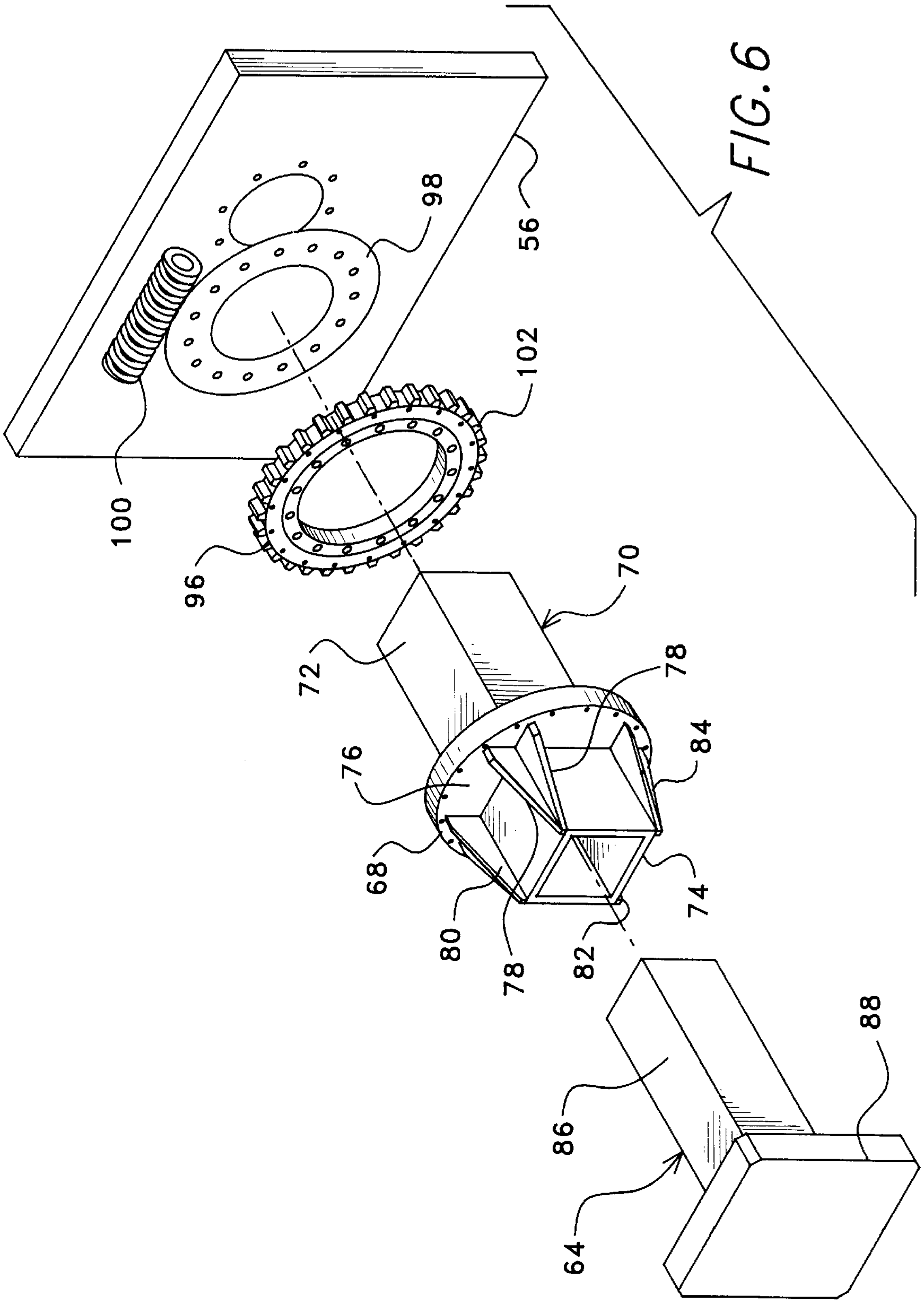
FIG. 6 is an exploded schematic view of the load attachment and rotation mechanism of the present invention.
Figure 10:
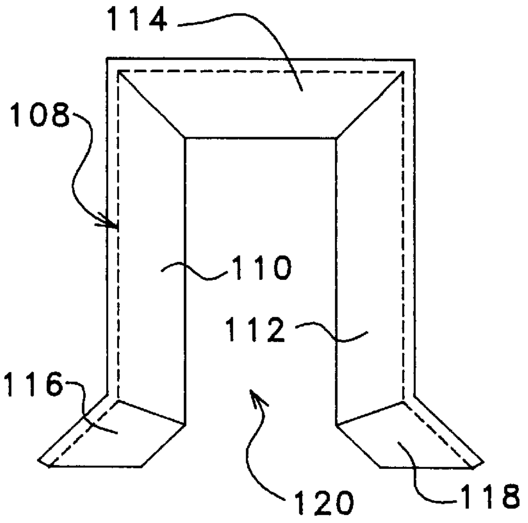
FIG. 10 is an enlarged front elevation view of a receiving member on a load utilized as part of the attachment and rotation mechanism of the present invention.
Figure 11:
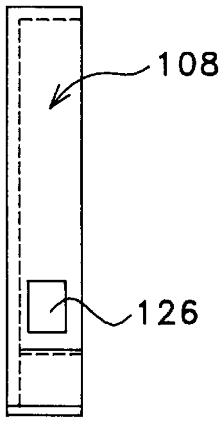
FIG. 11 is a side elevation view of the receiving member of FIG. 10.
Figure 7:
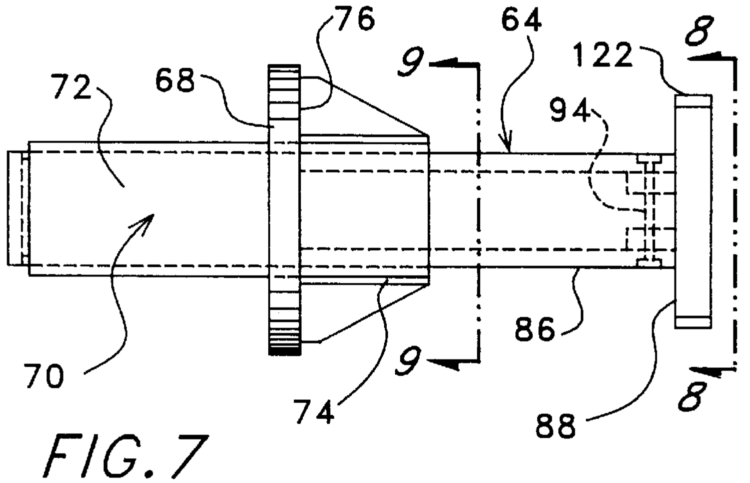
FIG. 7 is an enlarged schematic, with some parts in section of a load attachment member used with the present invention.
Figure 8:
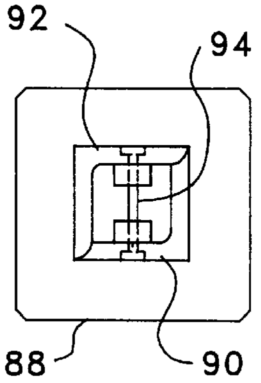
FIG. 8 is a front view taken substantially along line 8—8 of FIG. 7.
Figure 9:
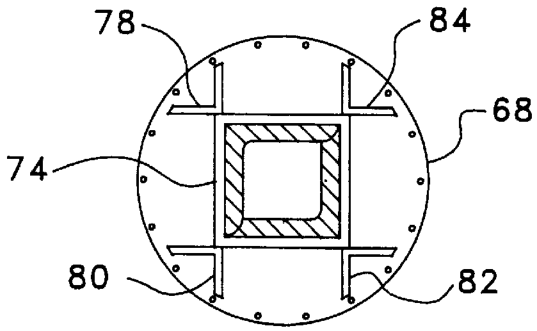
FIG. 9 is a cross sectional view taken substantially along line 9—9 of FIG. 7.

In an alternate form of the invention shown in FIG. 4, the device 10 can be adapted for suspension from a factory ceiling in the form of an overhead hoist system. In this instance, the movable load support carriage 14 includes a single load support beam 60 which is adapted to be moved horizontally across a factory ceiling by a hoist motor 62 or the like. In this instance, a pair of load support members 48, 50 each depend from the single beam 60 and are adapted to carry the lift arms 52, 54 much in the same manner as in the embodiment previously described and illustrated in FIGS. 1–3. However, all of the additional main frame structure 16 in the embodiment illustrated in FIG. 1 is not necessary inasmuch as the beam 60 is suspended from a ceiling or other fixed support 63, as opposed to being support on a ground surface. If one desires to move the container 12 attached to the lift arms 52, 54, the beam 60 is simply moved across the work site floor by the motor 62 to the desired location.

Referring now to FIGS. 5–11, the distal ends of lift arms 56, 58 include telescoping engagement ram members 64, 66, respectively. By way of example, one ram member and its associated components will be described. However, it should be understood that the ram members 64, 66 are essentially identical except for the fact that the one ram member 64 is associated with the mechanism for rotating the ram 64, while the other ram member 66 is associated with an idler gear as described below.

The ram member 64, in preferred form, includes a turret plate 68 having a substantially square, centrally disposed sleeve 70. The sleeve 70 has a rear portion 72 extending rearwardly from the turret 68 and a forward portion 74 which extends outwardly from the front surface 76 of the turret 68. In its preferred form, four angular brackets 78, 80, 82 and 84 are disposed proximate the four corners of the substantially square sleeve portion 74 so as to provide structural support for the sleeve 70 during high torque moments, as described below. A telescoping ram bolt 86 is sized and shaped to snugly fit within the sleeve 70. The distal end of the ram bolt 86 includes a connection plate 88 which is also preferably substantially square in cross section and has a width dimension greater than the width dimension of the ram bolt 86, which includes terminal bolt 94. In the illustrated preferred form, the ram bolt 86 is made up of two joined angle members 90 and 92, although it may be formed from a single element. The turret plate 68 is preferably disposed on a swing gear member 96 which is in turn associated with a hydraulically operated worm gear motor 98. The motor 98 includes a worm gear 100 which is sized and shaped to engage the teeth 102 disposed about the circumference of the swing gear 96. Thus, the worm gear 100 is operated by the motor 98 to rotate the swing gear 96, and likewise to rotate the turret plate 68 and the entire ram member 64.

In the ram member 66, the turret plate 68 is preferably positioned on an idler gear 104 which includes a plurality of detents (not illustrated) on the rear surface 106 thereof The detents on the rear surface 106 engage apertures in the lift arm plate 56 so that as the idler gear 104 is rotated, it is rotated and held into distinct rotational positions. In its preferred form, there are four detents which enable the idler gear 104 to be rotated to four distinct rotational positions approximately 90° apart. While an idler gear system is disclosed, it will be understood that other movement transmission elements may be used.

The engagement plate 88 on the ram bolt 86 functions as a male engagement member at the distal ends 56, 58 of each of the lift arms 52 and 54 to connect with the load container 12. To complete the connection, the load container 12 preferably includes a pair of trap brackets 108 on each side thereof. Each trap bracket 108 includes a pair of side members 110 and 112, a top member 114, and a pair of flared end edges 116 and 118. The bottom end 120 opposite the top end 114 is open and adapted to receive the plate 88. The trap bracket 108 is sized and shaped so that the plate 88 snugly slides within the area defined by the side members 110 and 112 until the top member 114 engages the top 122 of the plate 88.

To carry out the engagement of the plate 88 with the trap bracket 108, the plate 88 is aligned beneath the open bottom end 120, and then plate 88 is moved upwardly into the female trap bracket 108 until the top surface 122 of the plate 88 engages the end member 114. Then, a bolt 124 (FIG. 13) is moved across the open end 120, passing through apertures 126 which are included in each of the side members 110 and 112. The bolt 124 is sized and shaped to snugly fit within the apertures 126. Thus, when the bolt 124 is moved across and through the apertures 126, it closes the end 120 so as to firmly retain the plate 88 within the trap bracket 108 by creating an enclosed structure over the plate 88. As a result, the container 12 is firmly attached to the device 10.

Figure 12:
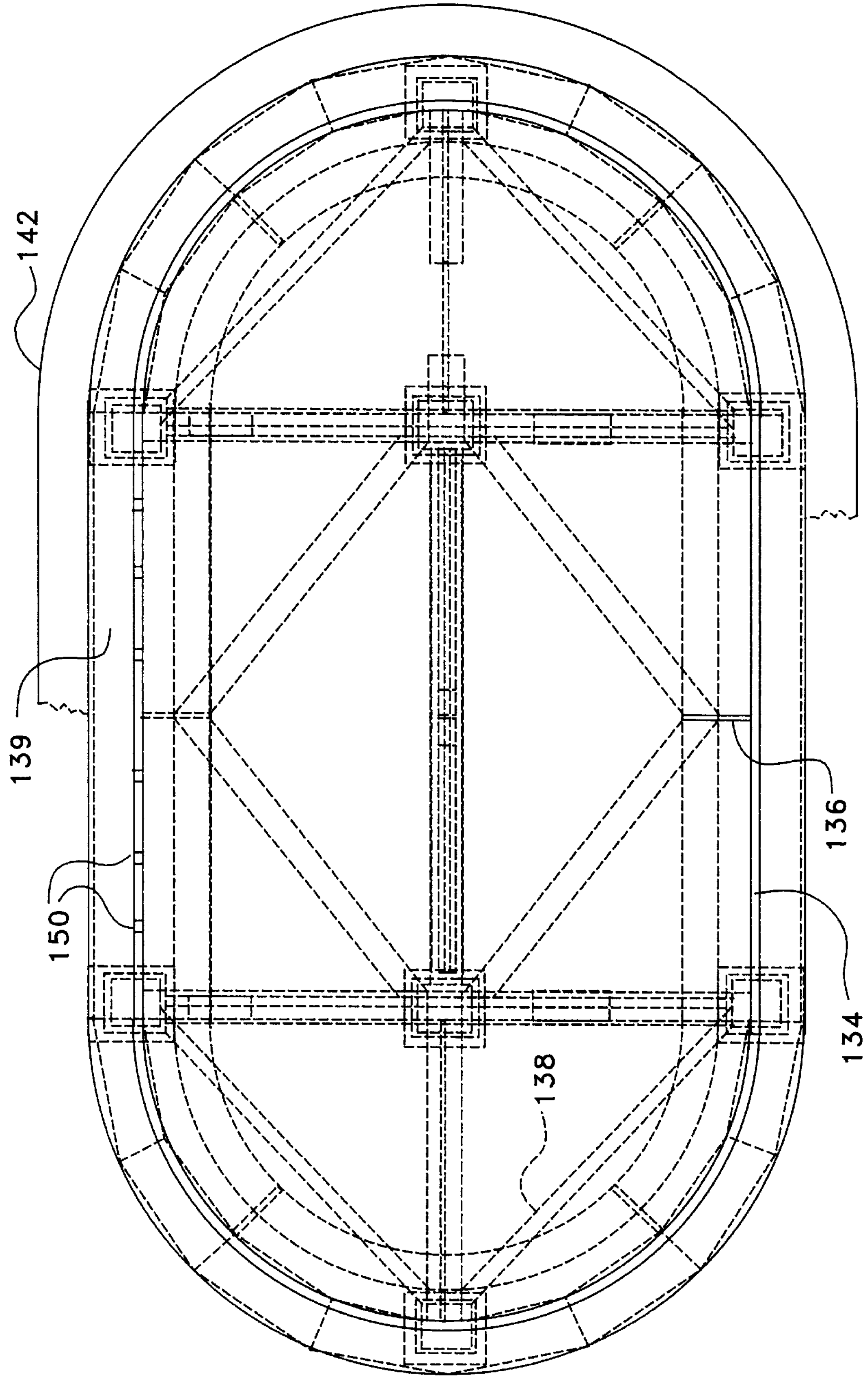
FIG. 12 is a top view, with parts in section, of an inner form for use in manufacturing concrete cisterns utilizing the device of the present invention.
Figure 13:
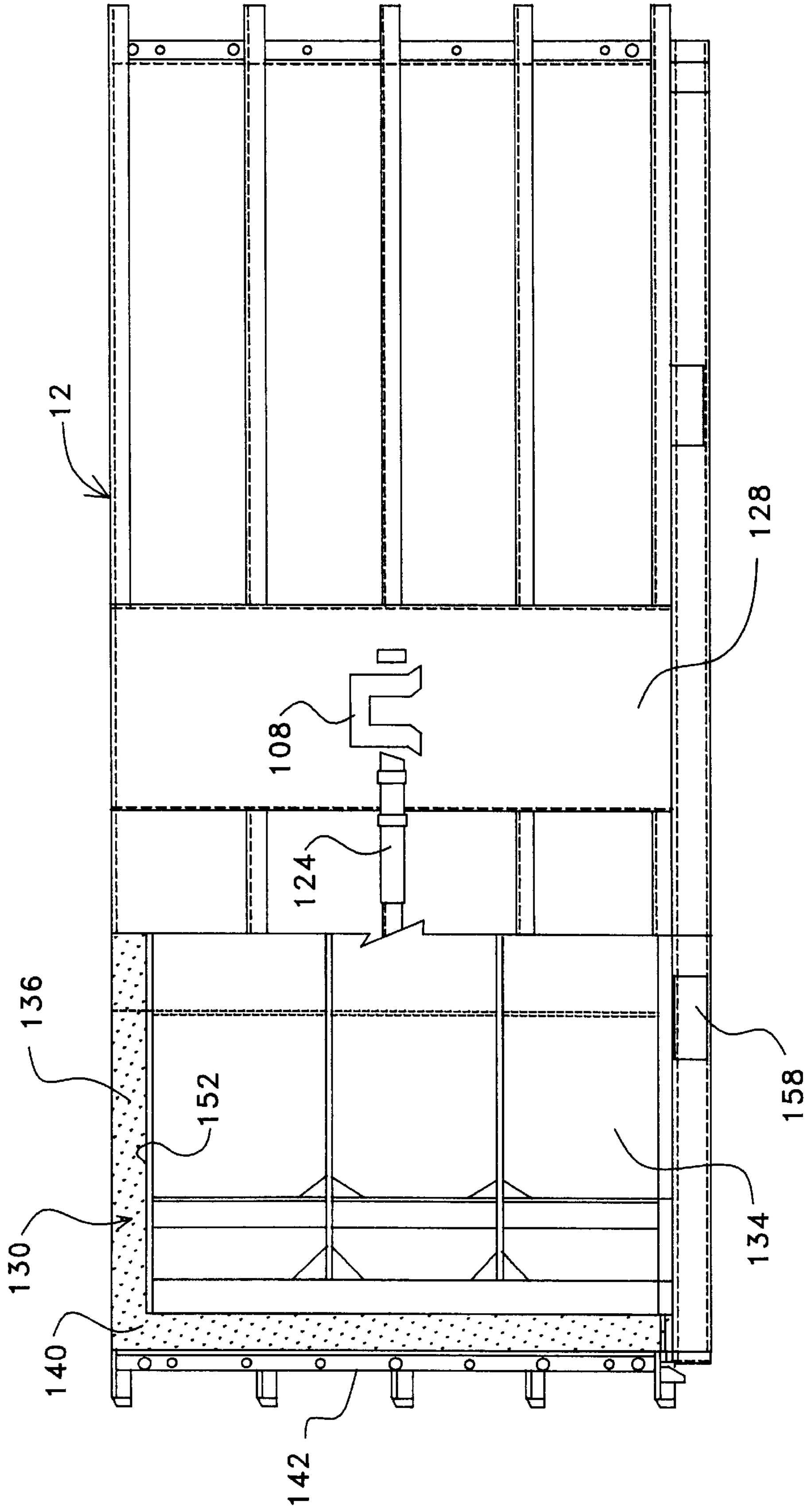
FIG. 13 is a side perspective view of a mold utilized in manufacturing concrete using the device of the present invention.
Figure 14:
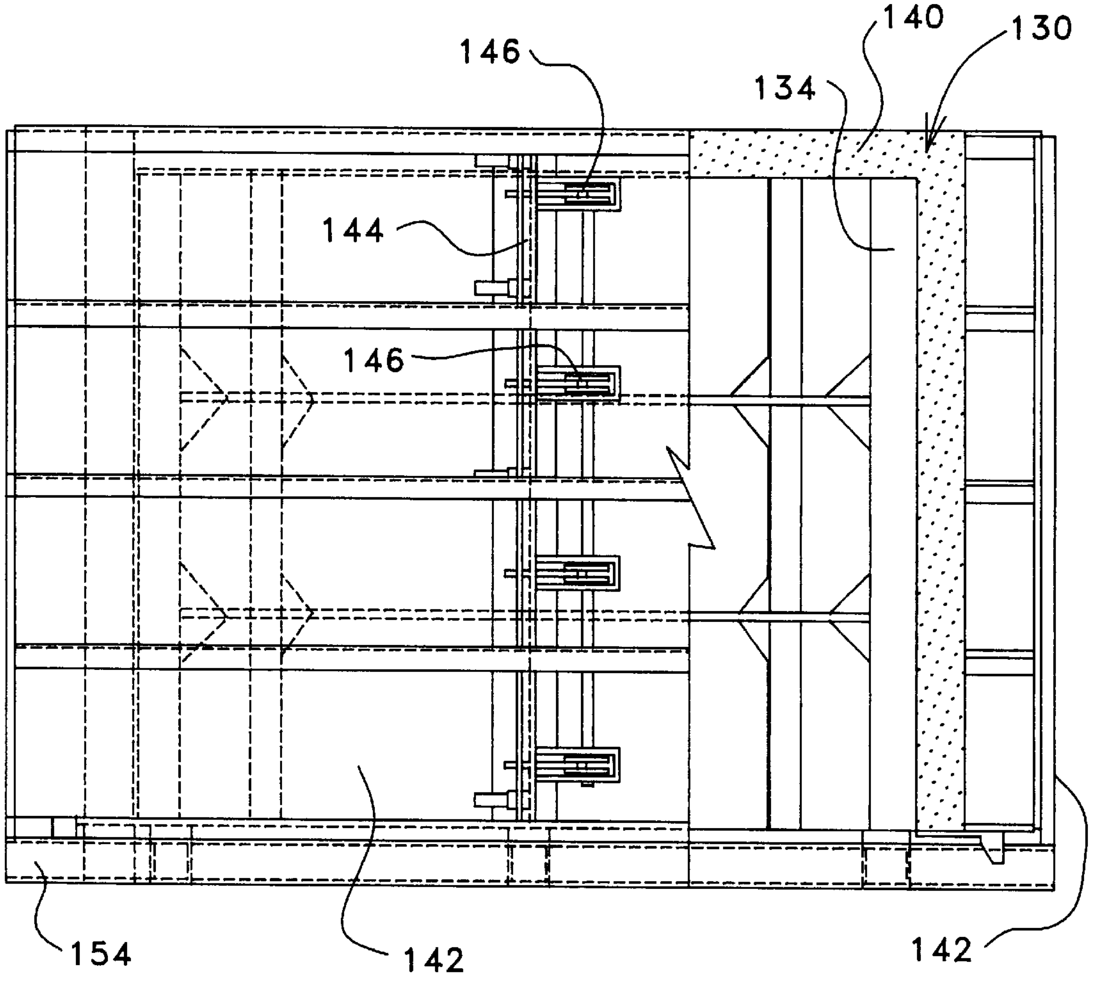
FIG. 14 is an end perspective view of the mold illustrated in FIG. 13.

Referring now to FIGS. 12–14, the load container 12 may be of any type for use with the device 10 so long as it includes trap brackets 108 and closure bolts 124. In one preferred form, a bump plate 128 is positioned along each side of the container 12 and provides a surface for mounting the trap brackets 108. Moreover, it also provides a surface to enable the plate 88 to firmly meet prior to sliding engagement within the bracket 108. Thus, the engagement rams 64 and 66 are extended, preferably using an hydraulic lift cylinders of any desired type but as illustrated at 129 of FIG. 1, until the end plates 88 engage the bump plate 128. Lift arms 52 and 54 are then moved vertically upwardly by the hydraulic lift cylinders 129 until the end plates 88 fully engage the trap brackets 108. Once the closure bolts 124 are moved through the apertures 126 so as to enclose the plates 88 within the brackets 108, the container 12 is in position to be lifted, moved, and rotated. When a container 12 is lifted above the ground surface, it can then be continuously rotated by the hydraulic motor 98 a full 360°, or more, if desired. When the container 12 is rotated 180°, the bolt 124 prevents the container 12 from dropping out of engagement with the end plates 88. Thus, the container 12 essentially slowly swivels at the end of the telescoping engagement ram member 64 and 66. In order to accommodate heavy container loads, the swing gear 96 and idler gear 104 include a plurality of bearings to enable the movement to take place.

In a preferred embodiment of the invention, the load containers 12 are utilized to manufacture concrete cisterns 130 (FIG. 15) having open top ends 132. To accomplish this, an inner core 134 is provided to form the inner surfaces of the cistern 130 as well as the bottom 136 (FIG. 17) of the cistern 130. The inner core 134 is preferably shaped in whatever desired shape the cistern is to have, in this case oval. The interior of the inner core 134 preferably includes heating coils 136 and a vibration mechanism 138. The heating coils 136 enhance the curing of the concrete 140. The outer form or jacket 142 is sized and shaped to surround the inner form 134 and to provide space 139 for the concrete 140. By operating the vibration mechanism 138 during the pouring process, a solid concrete member 140 without air voids or bubbles is ensured. As previously discussed, the outer jacket 132 includes bump plates 128 on each side thereof.

One end of the outer jacket 142 is split at 144 so that the outer form 142 is not a unitary member, thereby simplifying removal of the concrete article from the mold once it is cured. In preferred form, a plurality of toggle buckles 146 close the outer jacket 142 at 144 prior to the pouring of concrete. As is particularly seen in FIG. 13, the depth or height of the outer form jacket 142 is greater than the depth or height of the inner form 134. This arrangement enables the concrete 140 to be poured in the spaces 139 between the outer jacket 142 and the inner from 134 and across the top surface 152 of the inner form 134, the concrete covering the top surface 152 forming the bottom 136 of the cistern 130. Once the concrete 140 has hardened and cured and the inner form 134 removed, the toggle buckles 146 are loosened so as to separate the outer form 142 at 144 to enable it to be removed from the cistern 130. In its preferred form, a plurality of small round detentes 148 are provided around the interior surface of the outer jacket 142 to provide a gripping force against the cured concrete member 140 to help hold it in place when the outer jacket 142 and the concrete member 140 are lifted off the inner form 134 as described in greater detail below. It should also be noted that a plurality of small apertures 150 are provided throughout the wall of the inner form 134. These apertures enable air to be injected from within the inner form 134 against the concrete surface of the cured member 140 in order to break the bond between the steel inner form 134 and the concrete 140.

In its preferred form, the bottom of the interior form 134 includes a retention member 154 that has a plurality of notches 156 therein. The notches 156 are provided so that the outer jacket 142 may be engaged with the bottom portion 154 by engagement members 158. As will be more clearly described below, this enables the outer jacket 142 to be readily disengaged from the inner form 134 with the concrete cistern 130 still secured to the outer jacket 142 during the process of manufacture.

Figure 15:
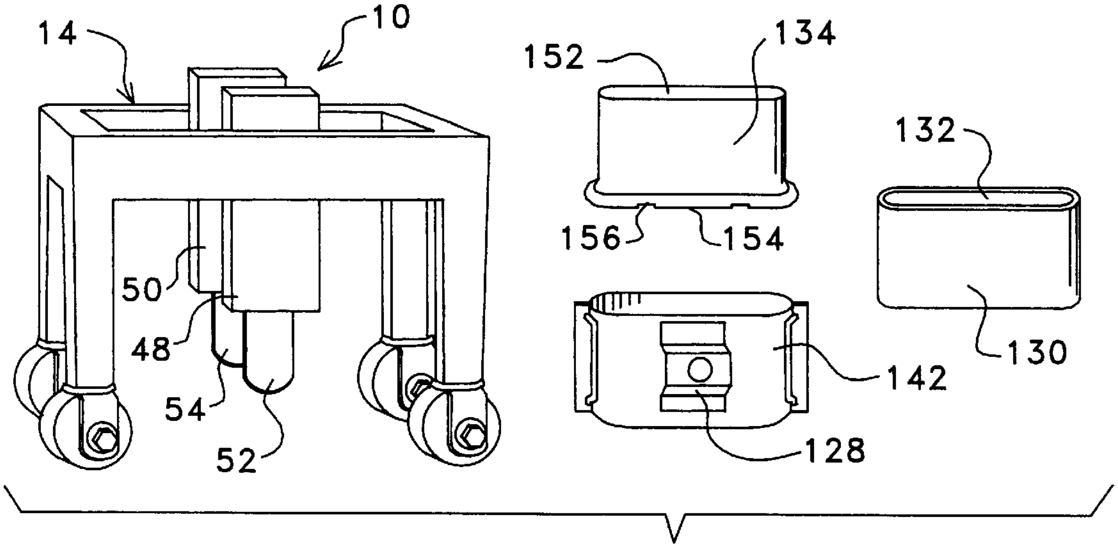
FIG. 15 is a schematic illustrating components utilized in the manufacture of concrete cisterns using the device of the present invention.
Figure 16A:
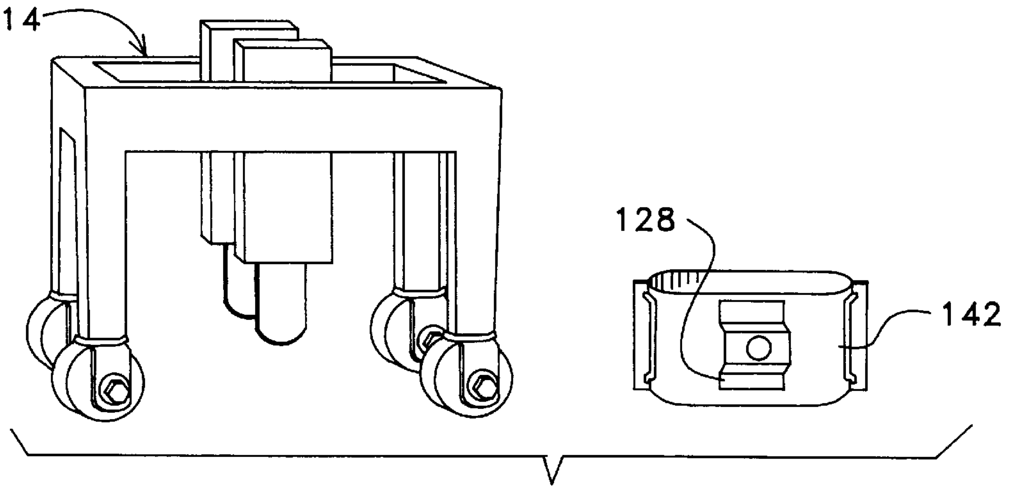
FIGS. 16*a*–16*g* are schematic views illustrating use of the device of the present invention used to prepare molds for pouring and curing of concrete in the manufacture of concrete cisterns.
Figure 16B:
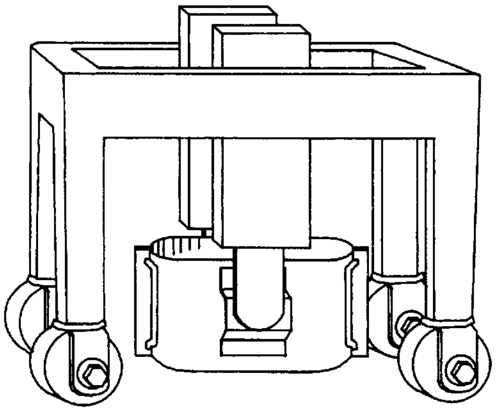
Figure 16C:
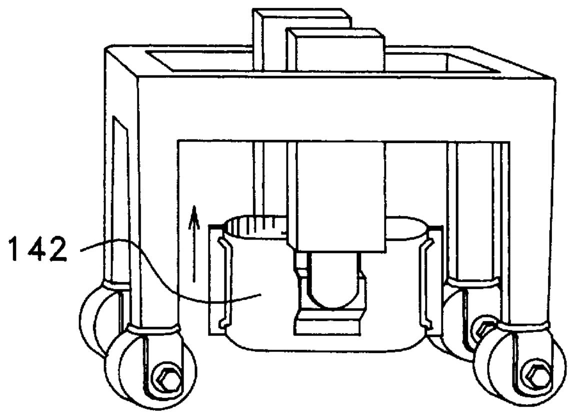
Figure 16D:
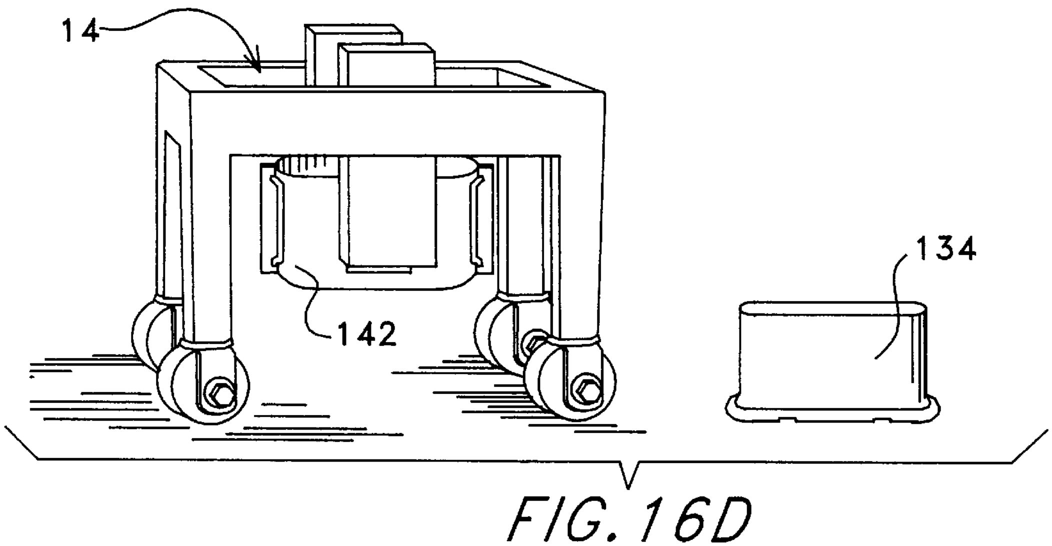
Figure 16E:
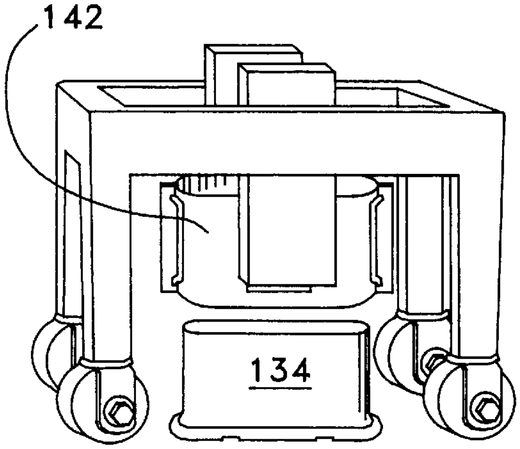
Figure 16F:
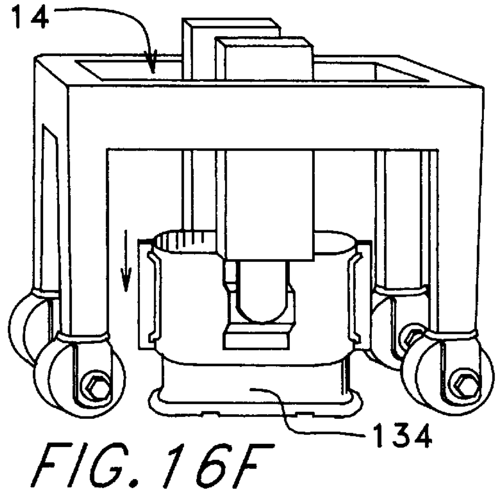
Figure 16G:
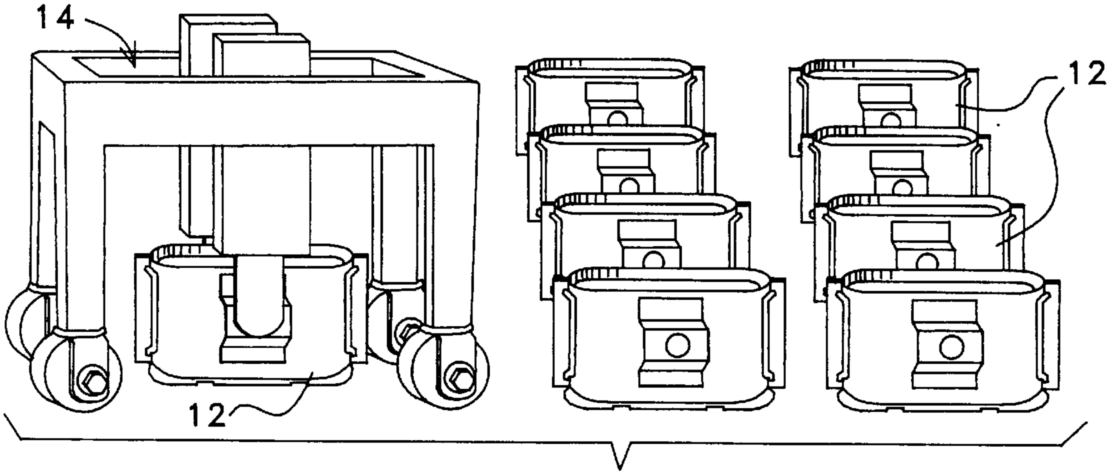

Referring now to FIGS. 15–17, the process utilizing the device of the present invention is illustrated. In this process the hoist device 14 is moved into position wherein the lift arms 52, 54 straddle either side of the outer jacket 142 of the container 12. The engagement ram members 64 and 66 are aligned with the bump plates 128 and then extended to beneath the trap brackets 108 on the sides of the container 12. The lift arms 52 and 54 are then moved vertically upwardly by the hydraulic motors lift cylinder until the end plates 88 of the ram bolts 86 engaged the brackets 108. The closure bolts 124 are then moved to close the openings 120 so as to fully engage the ram members 64 and 66 with the jacket 142. The jacket 142 is then lifted upwardly as illustrated in FIG. 16*c* and then moved toward and then aligned over an interior form 134 as illustrated in FIGS. 16*d* and 16*e*. The outer jacket 142 is then lowered by the lift arms 52, 54 onto the interior form 134 as illustrated in FIGS. 16*f* and 16*g*. Once the outer jacket is fully positioned over and around the inner form 134, the engagement members 158 are then inter-engaged with the bottom of the interior form 134 and the outer jacket 142 to form a mold container 12. These containers 12 are then moved into position as illustrated in FIG. 16*g*, and the concrete is then poured into the mold container 12 and onto the upper surface 152 of the interior form 134. The concrete 140 is then poured until it completely fills the space 139 between the outer jacket 142 and the form 134 and then covers the upper surface 152 to form the bottom 136 of the cistern 130.

Figure 17A:
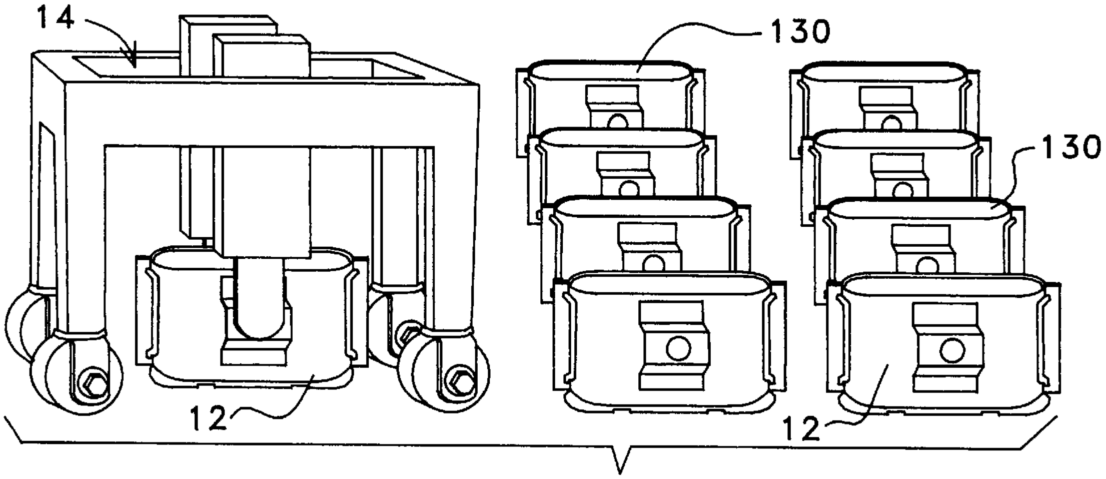
FIG. 17*a*–17*h* are schematic views illustrating the formation and location of cured concrete cisterns by the inversion and release of the molds carried by the device of the present invention.
Figure 17B:
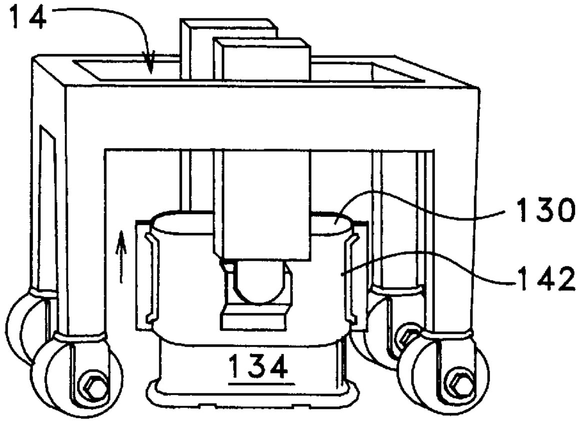
Figure 17C:
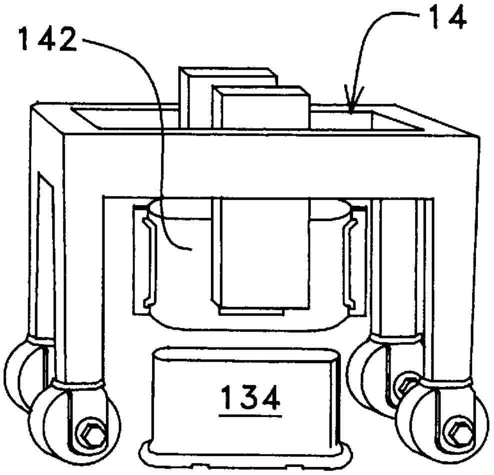
Figure 17D:
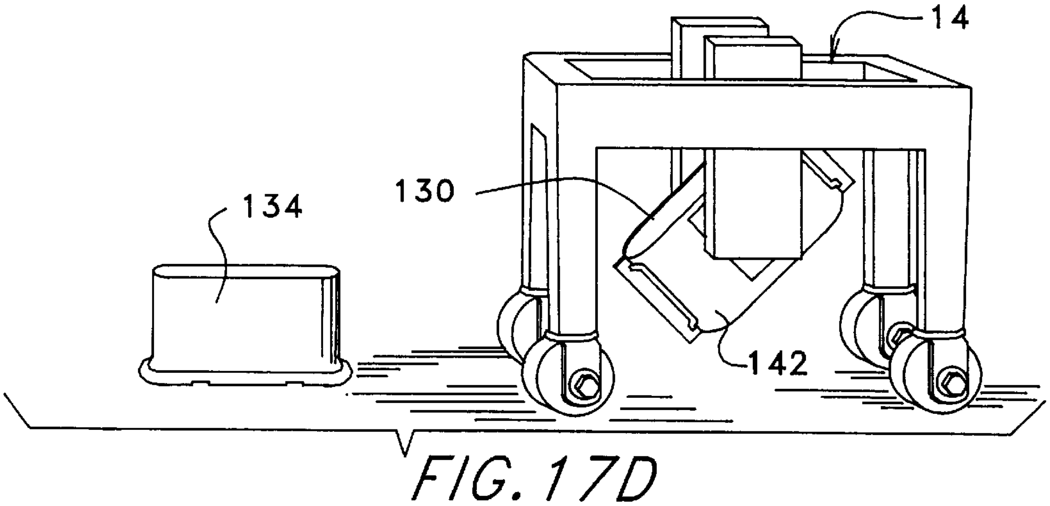
Figure 17E:
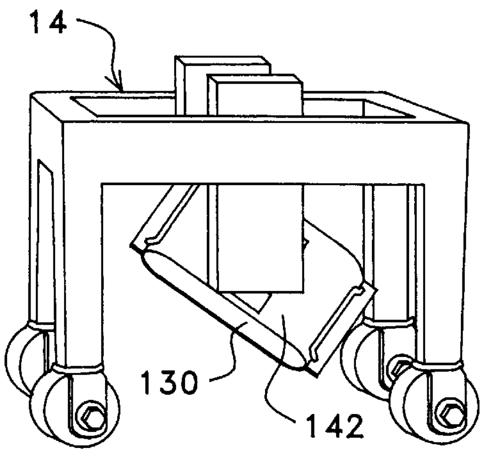

Once the concrete 140 is poured and cured, the hoist device 14 is then repositioned over a container 12, as illustrated in FIG. 17*a*. The ram members 64 and 66 are once again engaged with the trap brackets 108 with the closure bolts 124 fully closed. Then the engagement members 158 are removed so as to disconnect the bottom of the interior form 134 from the outer jacket 142. Once the outer jacket 142 has been disengaged from the inner form 134, air is injected through apertures 150 to break the bonds between the cured concrete 140 and the inner form 134. The lift arms 52 and 54 then move the outer jacket 142 with the cured concrete cistern 130 up, over and above the interior form 134, as illustrated in FIGS. 17*b* and 17*c*. Once the outer jacket 142 with the concrete cistern 130 have cleared the upper surface 152 of the inner form 134, the hoist device 14 then moves away from the form 134 as in FIG. 17*d*. At this time, the hydraulic motor assembly 98 is engaged to rotate the jacket 142 approximately 180° as at FIG. 17*d* and 17*e*. It should be noted that because of the power required to rotate this heavy weight, the rotation of the hydraulic motor 98 is relatively slow preferably at approximately two revolutions per minute. This is due to the fact that a substantial amount of force and torque must be applied inasmuch as the jacket 142 can weigh up to 6,500 pounds with the concrete cistern adding an additional 12,000 pounds. Thus, the lift arms 52 and 54 are designed to lift up to about 17.5 tons, or more, at full capacity. When used herein, the term "heavy load" or the like is intended to mean at least 10 tons.

Figure 17F:
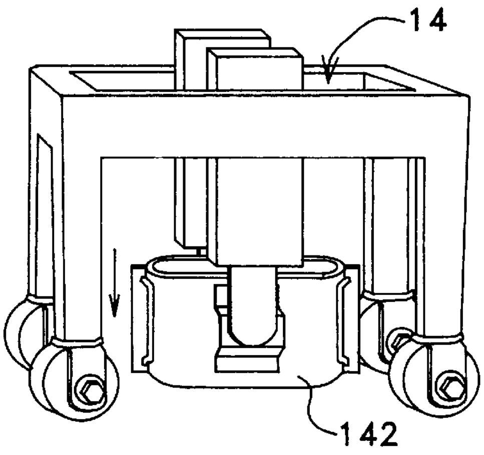
Figure 17G:
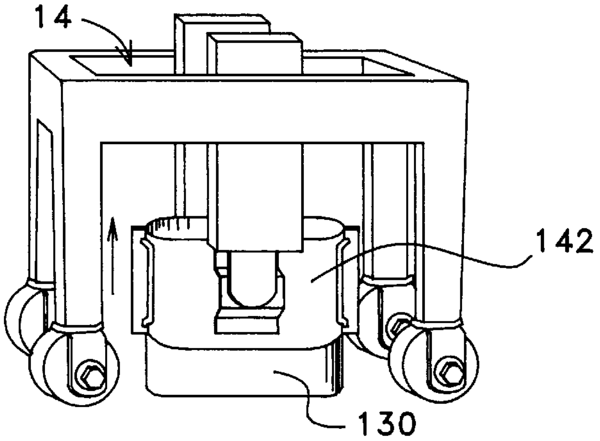
Figure 17H:
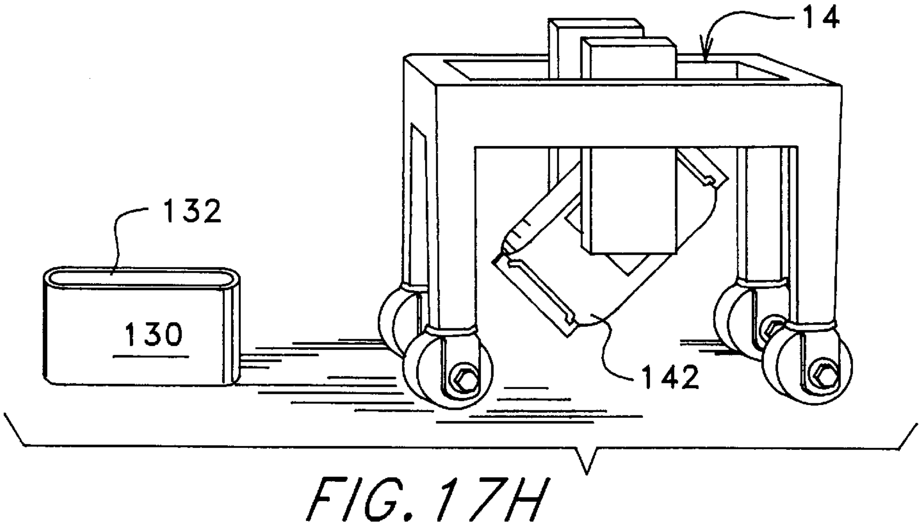

After the outer jacket 142 containing concrete cistern 130 has been rotated approximately 180°, the container 12 is lowered back to the ground surface at a second by the lift arms 52 and 54, as illustrated in FIG. 17*f*. At this time, the toggle buckles 146 on the outer jacket 142 can then be loosened so as to disengage the outer jacket 142 from the cured concrete cistern 130. The outer jacket 142 is then lifted vertically upwardly as illustrated in FIG. 17*g* until it clears the cistern 130 and then is moved out of position as at FIG. 17*h*. In this manner, the cistern 130 remains sitting on a support surface in an upright position so that the opening 132 is on top. Without the ability to rotate the container 12 at least 180° and disengaging it is this position, the cistern 130 would be in position in an upside down manner with the opening 132 lying on the ground surface. If this were the situation, the cistern 130, weighing approximately 12,000 pounds, would then have to in some manner be turned upright at some point in time. The present invention enables the cistern 130 to be manufactured and then deposited on a truck or any other support surface location in an upright manner.

As can be seen from the above, the present invention provides a unique movable load support device for both lifting and moving heavy containers which require inversion and release in an inverted position. The inversion and release aspect of lifting and moving heavy loads is the particularly advantageous aspect of the present invention inasmuch as there are no other known devices on the market or in the art which enable an extremely heavy load to be lifted, moved, inverted and then detached in its inverted position. The existing known devices are designed for rotation only for the purpose of emptying a container. As can be seen from the above, the purpose of rotation of the present invention is not to empty a container of its contents, but rather to be utilized in the formation of a concrete structure. The present invention enables the formation of concrete structures, such as extremely heavy septic tanks, cisterns, lift stations, interceptors, equipment vaults, meter pit vaults, vacuum relief vaults, pressure relief vaults, well heads, burial vaults, secondary containment vaults, water reclamation vaults and the like.in multiple units using one device as opposed to having one device forming only one unit at a time. The present invention can be utilized in the form of an independently driven ground vehicle hoist device or in the form of a movable overhead hoist system in a factory environment. The present invention enables containers to be readily grasped and lifted, and then moved to any desired position, whether the rotation is desired or not. Thus, the applications of the present invention extend far beyond that of the specific embodiment illustrated herein. However, the formation of open topped concrete structures is a particularly advantageous application of the present invention in that the present invention provides significant advantages of the formation of such concrete structures. A unique mold system for the formation of concrete cisterns for use with the device of the present invention is also disclosed.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

I claim:

1. A device for connecting to, lifting at a first location load support surface, moving, inverting and releasing at a second location load support surface individual heavy loads, said device comprising:

support means for individual heavy loads, said support means working within a perimeter;

means for selective and controlled connection to and selective and controlled detachment from individual heavy loads within said perimeter of said support means, said connection means carried by said support means;

means associated with said connection means for providing selective and controlled vertical upward and downward movement to said connection means and to any individual heavy load carried by said connection means;

means associated with said connection means for providing selective and controlled rotational movement of at least about 180° to said connection means and to any individual heavy load carried by said connection means; and means integral with said support means for moving said support means and any individual heavy load carried by said support means in a selective and controlled direction; whereby said device is designed and adapted for selective and controlled connection and attachment to individual heavy loads located at a first location load support surface, lifting of any such load vertically upward, moving of any such load, rotating any such load at least about 180°, lowering any such load vertically downward at a second location load support surface, and detaching said connection means from said individual heavy load within said perimeter of said support means to thereby deposit any such load.

2. The device as claimed in claim 1, wherein the lifting, rotating and moving capacity of said device is about 10 tons, or more.

3. The device as claimed in claim 1, wherein said load support means includes a ground vehicle integral with said support means for moving said support means.

4. The device as claimed in claim 1, wherein said load support means includes an overhead hoist system carried by a beam supported by a static structure.

5. The device as claimed in claim 1, wherein said means associated with said connection means for providing selective and controlled vertical upward and downward movement to said connection means and to any individual heavy load carried by said connection means includes at least two lifting arms, each lifting arm having a proximal end connected to and carried by said load support means and a free distal end, said free distal ends of said lifting arms being substantially opposed and spaced-apart from one another.

6. The device as claimed in claim 5, wherein said heavy load connection and detachment means is disposed at and operatively connected to said distal end of each said lifting arm and is operative for selective attachment to and detachment from a heavy load.

7. The device as claimed in claim 6, wherein said device further comprises lift means for vertically moving said lift arms.

8. The device as claimed in claim 7, wherein said lift means includes a hydraulic lift device.

9. The device as claimed in claim 5, wherein said load connection and detachment means and said rotational means comprises a ram member operable to move substantially perpendicular to said lift arm and adapted to releasably engage a heavy load.

10. The device as claimed in claim 9, wherein said ram member includes a distal male end having at least three sides adapted to journal with a female receptacle disposed on the side of a heavy load.

11. The device as claimed in claim 10, wherein said load attachment and detachment means and said rotational means further includes means for releasably locking said ram member in place within the female receptacle of a heavy load to maintain said ram member in position during rotation of said heavy load.

12. The device as claimed in claim 11, wherein the distal male end of said ram member is substantially square, wherein the female receptacle in each side of a heavy load is in the form of an open-ended U-shaped bracket, and wherein said means for releasably locking said ram member in place includes a longitudinal bolt member sized and shaped to close the open end of said U-shaped bracket after engagement of said ram member with the heavy load female receptacle.

13. The device as claimed in claim 9, wherein said rotational means comprises a bearing member secured to said ram member at the distal free end of each said lift arm, one said lift arm including a hydraulic rotational motor adapted to rotate said ram member and any load attached thereto.

14. The device as claimed in claim 13, wherein the lift arm opposite the lift arm with said hydraulic motor includes a plurality of detents at substantially equal intervals to maintain a load in proper rotational position at all times as it is being rotated by said hydraulic rotational motor.

15. A device for lifting and moving heavy loads requiring inversion, said device comprising:

a movable load support carriage said carriage having a perimeter;

means integral with said support carriage for moving said support carriage;

a pair of spaced-apart lift arms depending from said load support carriage, each said lift arm having a free distal end adapted for selective vertical movement relative to said load support carriage; and load attachment and rotational means disposed at the distal end of each said lift arm operative for selective attachment to an individual load for holding and lifting the load, for rotating an attached load at least about 180°, and for selectively detaching the load in an inverted position within said perimeter of said carriage.

16. The device as claimed in claim 15, wherein the lift capacity of said lift arms is about 10 tons, or more.

17. The device as claimed in claim 15, wherein said device further comprises a pair of support members secured to said load support carriage opposite each other, each said lift arm having a proximate end secured to one said support member with each said support member including a hydraulic lift for vertically moving said lift arm.

18. The device as claimed in claim 15, wherein said load attachment and rotational means comprises a ram member operable to move substantially perpendicular to said lift arms and adapted to releasably engage the side of a load.

19. The device as claimed in claim 18, wherein said ram member includes a distal male end having at least three sides adapted to journal with a female receptacle disposed on the side of a load.

20. The device as claimed in claim 19, wherein said load attachment and rotational means further includes means for releasably locking said ram in place within the female receptacle of a load to maintain said ram in position during rotation of the load.

21. The device as claimed in claim 20, wherein the distal male end of said ram member is selected from the group of shapes including triangles, squares, angular polygons, U-shapes, and ovals, wherein the female receptacle in each side of a load is in the form of an open-ended U-shaped bracket, and wherein said means for releasably locking said ram member in place includes a longitudinal bolt member sized and shaped to close the open end of said U-shaped bracket after engagement of said ram with the load female receptacle.

22. The device as claimed in claim 18, wherein the distal free end of each said lift arm includes a bearing member secured to said ram member, one said lift arm including a hydraulic rotational motor adapted to rotate said ram member and any load attached thereto.

23. The device as claimed in claim 22, wherein the lift arm opposite the lift arm with said hydraulic motor includes a plurality of detents at substantially equal intervals to maintain a load in proper rotational position at all times as it is being rotated by said hydraulic rotational motor.

24. The device as claimed in claim 15, wherein said load support carriage comprises an overhead hoist member carried by a beam supported by a static structure.

25. The device as claimed in claim 15, wherein said load support carriage includes a self-propelled movable ground vehicle.

26. A mobile, self-propelled hoist device for lifting and moving molds used in the formation of concrete members, which molds require inversion, said device comprising:

a main frame including a pair of spaced-apart longitudinally extending side support beams secured together by at least a pair of cross-beam members said support beams and cross beams defining a perimeter;

a plurality of wheels supporting said main frame with at least two wheels on each side substantially directly under said side support beams, said wheels being connected to said side support beams by substantially vertically extending strut members;

means for propelling and steering said wheels integral with said wheels;

a pair of load support members each depending downwardly from the proximate middle of one side support beam and including a lift arm having a free distal end, said lift arm being adapted for selective vertical movement relative to said main frame; and mold attachment and rotational means disposed at the distal end of each said lift arm operative for selective attachment to a mold for holding and lifting the mold, for rotating an attached mold at least 180°, and for detaching the mold in an inverted position within said perimeter of said main frame.

27. The hoist device as claimed in claim 26, wherein lift capacity of said device is about 10 tons, or more.

28. The hoist device as claimed in claim 26, wherein said mold attachment and rotational means comprises a pair of telescoping engagement rams operable to move substantially perpendicular to said lift arms from the free distal ends thereof to engage the side of a concrete mold.

29. The hoist device as claimed in claim 28, wherein each said telescoping engagement ram includes a male distal end having at least three sides adapted to be journaled with a female receiving member disposed on the side of a concrete mold, and wherein said device further includes means to releasably lock each said ram in position within a female receiving member.

30. The hoist device as claimed in claim 29, wherein said telescoping engagement ram male end portion is substantially square, said female receiving member is substantially in the form of an open-ended U-shaped member, and wherein said means for releasably locking the male member into the female member comprises a bolt sized and shaped to close the open end of said U-shaped member.

31. The mold device as claimed in claim 29, wherein said outer jacket form is sized in depth greater than said inner core form to permit the pouring of concrete to form the bottom of said cistern from the top of said mold device.

32. The hoist device as claimed in claim 28, wherein the distal end of one said lift arm includes a bearing member secured to said telescoping engagement ram and a hydraulic rotational motor for rotating said ram upon engagement with a concrete mold member, and wherein the distal end of the opposite lift arm includes a bearing member secured to said telescoping engagement ram, and ball detent means arranged at approximately 90° intervals to maintain a concrete mold in proper rotational position at all times during rotation by said hydraulic rotational motor.

33. The hoist device as claimed in claim 32, wherein said female receptacle means comprise an open-ended U-shaped member, and a movable bolt sized and shaped for selective closing of the open end of said U-shaped member.

34. The hoist device as claimed in claim 26, wherein said device is adapted to move along a ground surface while lifting and holding said concrete mold in either an upright or an inverted position.

35. A device for connecting to, lifting at a first location load support surface, moving, inverting and releasing at a second location load support surface individual heavy loads, said device comprising:

support means for individual heavy loads;

means for selective and controlled connection to and selective and controlled detachment from individual heavy loads, said connection means carried by said support means;

means associated with said connection means for providing selective and controlled vertical upward and downward movement to said connection means and to any individual heavy load carried by said connection means, wherein said means associated with said connection means for providing selective and controlled vertical upward and downward movement to said connection means includes at least two lifting arms, each lifting arm having a proximal end connected to and carried by said support means and a free distal end, said free distal ends of said lifting arms being substantially opposed and spaced-apart from one another;

means associated with said connection means for providing selective and controlled rotational movement of at least about 180° to said connection means and to any individual heavy load carried by said connection means, wherein both said load connection and detachment means and said rotational means includes a ram member operable to move substantially perpendicular to said lift arms and adapted to releasably engage a heavy load, wherein said ram member includes a distal male end having at least three sides adapted to journal with a female receptacle disposed on the side of a heavy load; and means integrally associated with said support means for moving said support means and any individual heavy load carried by said support means in a selective and controlled direction; whereby said device is designed and adapted for selective and controlled connection and attachment to individual heavy loads located at a first location load support surface, lifting of any such load vertically upward, moving of any such load, rotating any such load at least about 180°, lowering any such load vertically downward at a second location load support surface, and detaching said connection means from said individual heavy load to thereby deposit any such load.

36. A mobile, self-propelled hoist device for lifting and moving molds used in the formation of concrete members, which molds may require inversion, said device comprising:

a main frame including a pair of spaced-apart longitudinally extending side support beams secured together by at least a pair of cross-beam members;

a plurality of wheels supporting said main frame with at least two wheels on each side substantially directly under said side support beams, said wheels being connected to said side support beams by substantially vertically extending strut members;

means for propelling and steering said wheels;

a pair of load support members each depending downwardly from the proximate middle of one side support beam and including a lift arm having a free distal end, said lift arm being adapted for selective vertical movement relative to said main frame; and mold attachment and rotational means disposed at the distal end of each said lift arm operative for selective attachment to a mold for holding and lifting the mold, for rotating an attached mold at least 180°, and for detaching the mold in an inverted position, wherein said mold attachment and rotational means comprises a pair of telescoping engagement rams operable to move substantially perpendicular to said lift arms from the free distal ends thereof to engage the side of a concrete mold.

* * * * *